United States Patent
Pasma et al.

(10) Patent No.: US 9,634,351 B2
(45) Date of Patent: Apr. 25, 2017

(54) MECHANICAL STRUCTURES FOR MAINTAINING STRUCTURAL INTEGRITY IN CYLINDRICAL POUCH CELL BATTERIES

(71) Applicant: Apple Inc., Cupertino, CA (US)

(72) Inventors: Christopher R. Pasma, Cupertino, CA (US); George V. Anastas, San Carlos, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/214,128

(22) Filed: Mar. 14, 2014

(65) Prior Publication Data

US 2015/0263378 A1    Sep. 17, 2015

(51) Int. Cl.
*H01M 10/04* (2006.01)

(52) U.S. Cl.
CPC ... *H01M 10/0468* (2013.01); *H01M 10/0431* (2013.01); *Y10T 29/4911* (2015.01)

(58) Field of Classification Search
CPC ............... H01M 10/0431; H01M 10/0468
See application file for complete search history.

(56) References Cited

U.S. PATENT DOCUMENTS

| | | | | |
|---|---|---|---|---|
| 6,033,795 A | * | 3/2000 | Broussely | H01M 6/10 429/231.1 |
| 6,051,038 A | * | 4/2000 | Howard | H01M 2/26 29/623.1 |
| 6,083,640 A | * | 7/2000 | Lee | H01M 2/0277 429/161 |
| 6,383,234 B1 | * | 5/2002 | Noh | H01M 10/0413 29/623.1 |
| 2008/0102354 A1 | * | 5/2008 | Lee | H01M 10/0431 429/94 |
| 2011/0076549 A1 | * | 3/2011 | Kim | H01M 10/0431 429/174 |
| 2012/0115025 A1 | * | 5/2012 | Kim | H01M 2/08 429/186 |

* cited by examiner

*Primary Examiner* — Carlos Barcena
(74) *Attorney, Agent, or Firm* — Polsinelli PC

(57) ABSTRACT

The disclosed embodiments relate to the design and manufacture of a battery cell. The battery cell includes a jelly roll containing layers which are wound together, including a cathode with an active coating, a separator, and an anode with an active coating. The battery cell also includes a mechanical structure disposed around a perimeter of the jelly roll to maintain a structural integrity of the jelly roll. Finally, the battery cell includes a pouch enclosing the mechanical structure and the jelly roll, wherein the pouch is flexible.

18 Claims, 9 Drawing Sheets

(CONVENTIONAL POUCH CELL WITH JELLY ROLL)

PORTABLE ELECTRONIC DEVICE 800

MECHANICAL STRUCTURES FOR MAINTAINING STRUCTURAL INTEGRITY IN CYLINDRICAL POUCH CELL BATTERIES

BACKGROUND

Field

The disclosed embodiments relate to batteries for portable electronic devices. More specifically, the disclosed embodiments relate to mechanical structures for maintaining structural integrity in cylindrical pouch battery cells.

Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

During operation, a lithium-polymer battery's capacity may diminish over time from an increase in internal impedance, electrode and/or electrolyte degradation, excessive heat, and/or abnormal use. For example, oxidation of electrolyte and/or degradation of cathode and anode material within a battery may be caused by repeated charge-discharge cycles and/or age, which in turn may cause a gradual reduction in the battery's capacity. As the battery continues to age and degrade, the capacity's rate of reduction may increase, particularly if the battery is continuously charged at a high charge voltage and/or operated at a high temperature.

Continued use of a lithium-polymer battery over time may also produce swelling in the battery's non-rigid cells and eventually cause the battery to exceed the designated maximum physical dimensions of the portable electronic device. Internal stresses induced by the swelling may also damage the internal layers of the battery, resulting in an increase in the internal resistance of battery and/or failure of the battery. Moreover, conventional battery-monitoring mechanisms may not include functionality to manage swelling of the battery. As a result, a user of the device may not be aware of the battery's swelling and/or degradation until the swelling results in physical damage to the device.

Hence, what is needed is a mechanism for mitigating swelling in and otherwise maintaining structural integrity for batteries in portable electronic devices.

SUMMARY

The disclosed embodiments relate to the design and manufacture of a battery cell. The battery cell includes a jelly roll containing layers which are wound together, including a cathode with an active coating, a separator, and an anode with an active coating. The battery cell also includes a mechanical structure disposed around a perimeter of the jelly roll to maintain a structural integrity of the jelly roll. Finally, the battery cell includes a pouch enclosing the mechanical structure and the jelly roll, wherein the pouch is flexible.

In some embodiments, the battery cell also includes a first conductive tab coupled to the cathode and a second conductive tab coupled to the anode. The first and second conductive tabs extend through seals in the pouch to provide terminals for the battery cell.

In some embodiments, the mechanical structure includes a tube.

In some embodiments, the mechanical structure also includes an end cap disposed around an edge of the tube to prevent damage to the pouch by the tube and/or a plastic washer disposed between an end of the jelly roll and an edge of the tube adjacent to the end of the jelly roll.

In some embodiments, the tube includes at least one of metal, plastic, ceramic, and a perforation.

In some embodiments, the mechanical structure encloses an outer perimeter of the jelly roll or is disposed within an inner perimeter of the jelly roll.

In some embodiments, the mechanical structure includes a spring, a wire mesh, and/or a thread wrapped around the jelly roll.

In some embodiments, the mechanical structure includes a sheet wrapped around the jelly roll. The sheet includes a seal (e.g., heat seal, welded seal, adhesive seal, mechanical clip, etc.) to enclose the perimeter of the jelly roll in the sheet.

In some embodiments, the jelly roll is cylindrical.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
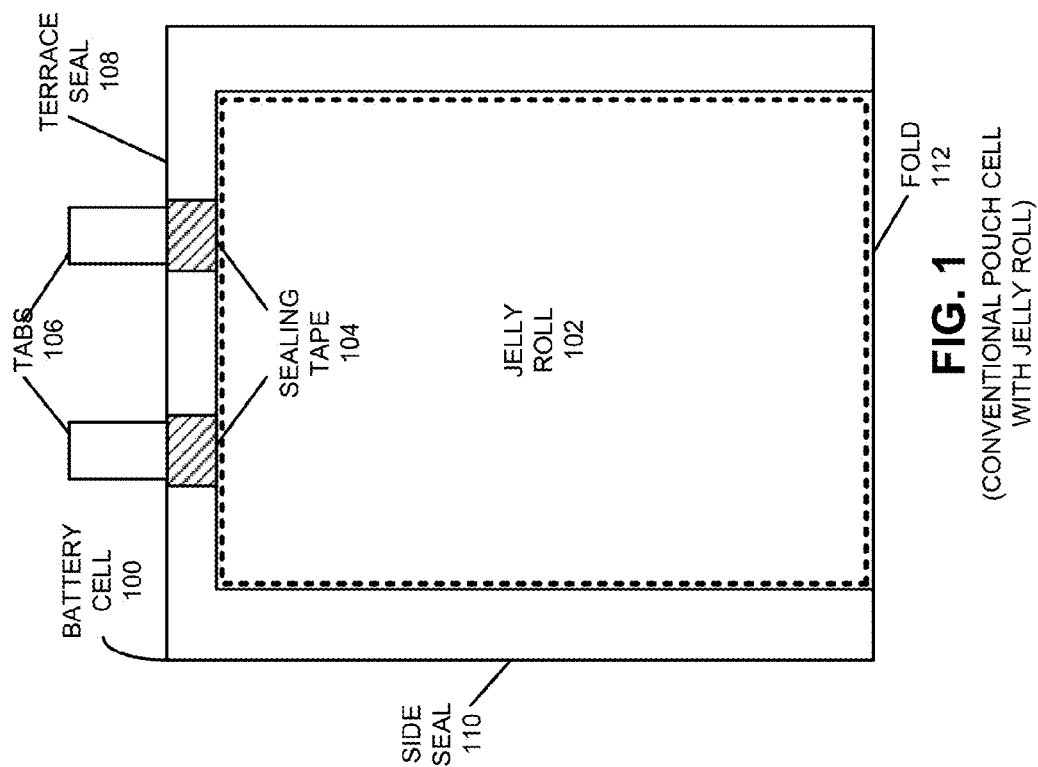
FIG. 1 shows a top-down view of a battery cell in accordance with the disclosed embodiments.

FIG. 1 shows a top-down view of a conventional pouch cell battery 100 that includes a jelly roll in accordance with an embodiment. Battery cell 100 may correspond to a lithium-polymer cell that is used to power a portable electronic device. Battery cell 100 includes a jelly roll 102 containing a number of layers which are wound together, including a cathode with an active coating, a separator, and an anode with an active coating. More specifically, jelly roll 102 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Jelly rolls are well known in the art and will not be described further.

During assembly of battery cell 100, jelly roll 102 is enclosed in a flexible pouch, which is formed by folding a flexible sheet along a fold line 112. For example, the flexible sheet may be made of aluminum with a polymer film, such as polypropylene. After the flexible sheet is folded, the flexible sheet can be sealed, for example by applying heat along a side seal 110 and along a terrace seal 108.

Jelly roll 102 also includes a set of conductive tabs 106 coupled to the cathode and the anode. Conductive tabs 106 may extend through seals in the pouch (for example, formed using sealing tape 104) to provide terminals for battery cell 100. Conductive tabs 106 may then be used to electrically couple battery cell 100 with one or more other battery cells to form a battery pack. For example, the battery pack may be formed by coupling the battery cells in a series, parallel, or series-and-parallel configuration. The coupled cells may be enclosed in a hard case to complete the battery pack, or the coupled cells may be embedded within the enclosure of a portable electronic device, such as a laptop computer, tablet computer, mobile phone, personal digital assistant (PDA), digital camera, and/or portable media player.

Those skilled in the art will appreciate that reductions in battery capacity may result from factors such as age, use, defects, heat, and/or damage. Furthermore, a decrease in battery capacity beyond a certain threshold (e.g., below 80% of initial capacity) may be accompanied by swelling of the battery that damages or distorts the battery and/or portable electronic device.

In particular, charging and discharging of battery cell 100 may cause a reaction of electrolyte with cathode material, resulting in oxidation of the electrolyte and/or degradation of the cathode material. The reaction may both decrease the capacity of battery cell 100 and cause swelling through enlargement of the cathode and/or gas buildup inside battery cell 100. Internal stresses induced by the swelling may cause the layers of jelly roll 102 to tear, resulting in an increase in the internal resistance of battery cell 100 (e.g., in the case of a partial tear) and/or failure of the battery cell 100 (e.g., in the case of a complete tear).

In one or more embodiments, the structural integrity of battery cell 100 is maintained by a mechanical structure disposed around a perimeter of jelly roll 102. As shown in the cross-sectional diagram illustrated in FIG. 2, the mechanical structure may include a cylindrical tube 202 surrounding an exterior perimeter of jelly roll 102. Both jelly roll 102 and tube 202 may be sealed inside a flexible pouch 204 to form the battery cell. In addition, one or more tabs 206 may be coupled (e.g., welded) to the cathode and anode of jelly roll 102 and extend through seals in pouch 204 to provide terminals for the battery cell.

Tube 202 may be a metal (e.g., stainless steel, aluminum, etc.) tube with a pre-specified radius and/or thickness (e.g., 25-100 microns) that is formed using an extrusion process, cut to the desired length (e.g., slightly longer than jelly roll 102), and deburred before jelly roll 102 is placed inside tube 202. Alternatively, tube 202 may be made of other materials, such as ceramic and/or plastic. Tube 202 may additionally include one or more perforations for facilitating electrolyte flow within the battery cell. For example, tube 202 may include a series of regularly spaced holes that allow electrolyte to flow between the inside of tube 202 and the space between the outside of tube 202 and pouch 204.

Because tube 202 provides a rigid structure around the perimeter of jelly roll 102, tube 202 may constrain swelling of jelly roll 102 to within the space inside tube 202 and mitigate degradation and/or failures resulting from such swelling. For example, tube 202 may uniformly constrain expansion of a cylindrical jelly roll 102 in all radial directions, thus mitigating loss of capacity and/or preventing the layers of jelly roll 102 from tearing as a result of internal stresses induced by swelling in jelly roll 102. The rigidity of tube 202 may also protect the battery cell from external mechanical stress that may otherwise dent, bend, puncture, and/or damage the battery cell. Moreover, the fixed size of tube 202 may provide a more consistent geometry for the battery cell than a conventional pouch cell that lacks a rigid mechanical structure inside its pouch and thus takes on the dimensions of the jelly roll within the pouch.

The sealing of both tube 202 and jelly roll 102 inside pouch 204 may additionally avert issues associated with enclosing a jelly roll and a pouch with an external mechanical structure (e.g., a rigid tube). For example, the pouch may prevent the external mechanical structure (e.g., a rigid tube) from containing the jelly roll tightly enough to avert swelling that causes the jelly roll to tear. At the same time, seals in the pouch cell may form bumps between the jelly roll and the inner surface of the mechanical structure and create wrinkles and/or tears in the jelly roll as the jelly roll swells and presses against the bumps.

Figure 3A:
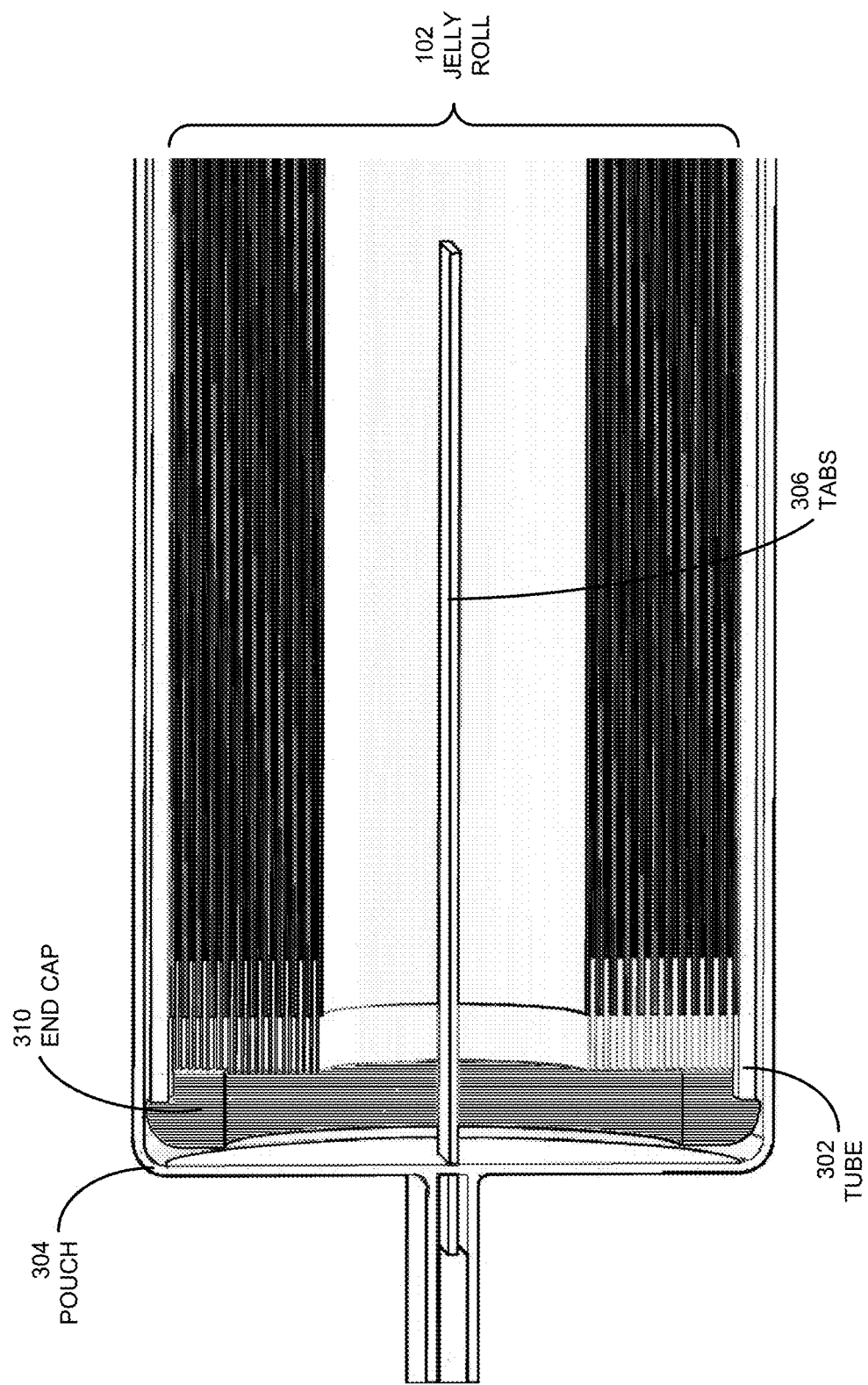
FIG. 3A shows a cross-sectional view of a battery cell in accordance with the disclosed embodiments.

Additional components may be added to the mechanical structure to further protect jelly roll 102 and/or the battery cell from mechanical stress and/or damage. As shown in FIG. 3A, an end cap 310 may be disposed over a tube 302 that provides a mechanical structure for enclosing the perimeter of jelly roll 102 and/or maintaining the structural integrity of jelly roll 102. Jelly roll 102, tube 302, and end cap 310 may be sealed in a flexible pouch 304, and conductive tabs 306 may be coupled to the cathode and anode of jelly roll 102 and extended through seals in pouch 304 to provide terminals for the battery cell.

End cap 310 may prevent the sharp edges of tube 302 from damaging pouch 304 and/or jelly roll 102. For example, end cap 310 may be a piece of plastic and/or another soft, insulating material that fits over the edge of tube 302 near one end of the battery cell. A corresponding plastic end cap (not shown) may be placed over the other edge of tube 302 near the other end of the battery cell. As a result, both ends of jelly roll 102 and pouch 304 may be protected from tearing and/or puncture by tube 302.

Figure 3B:
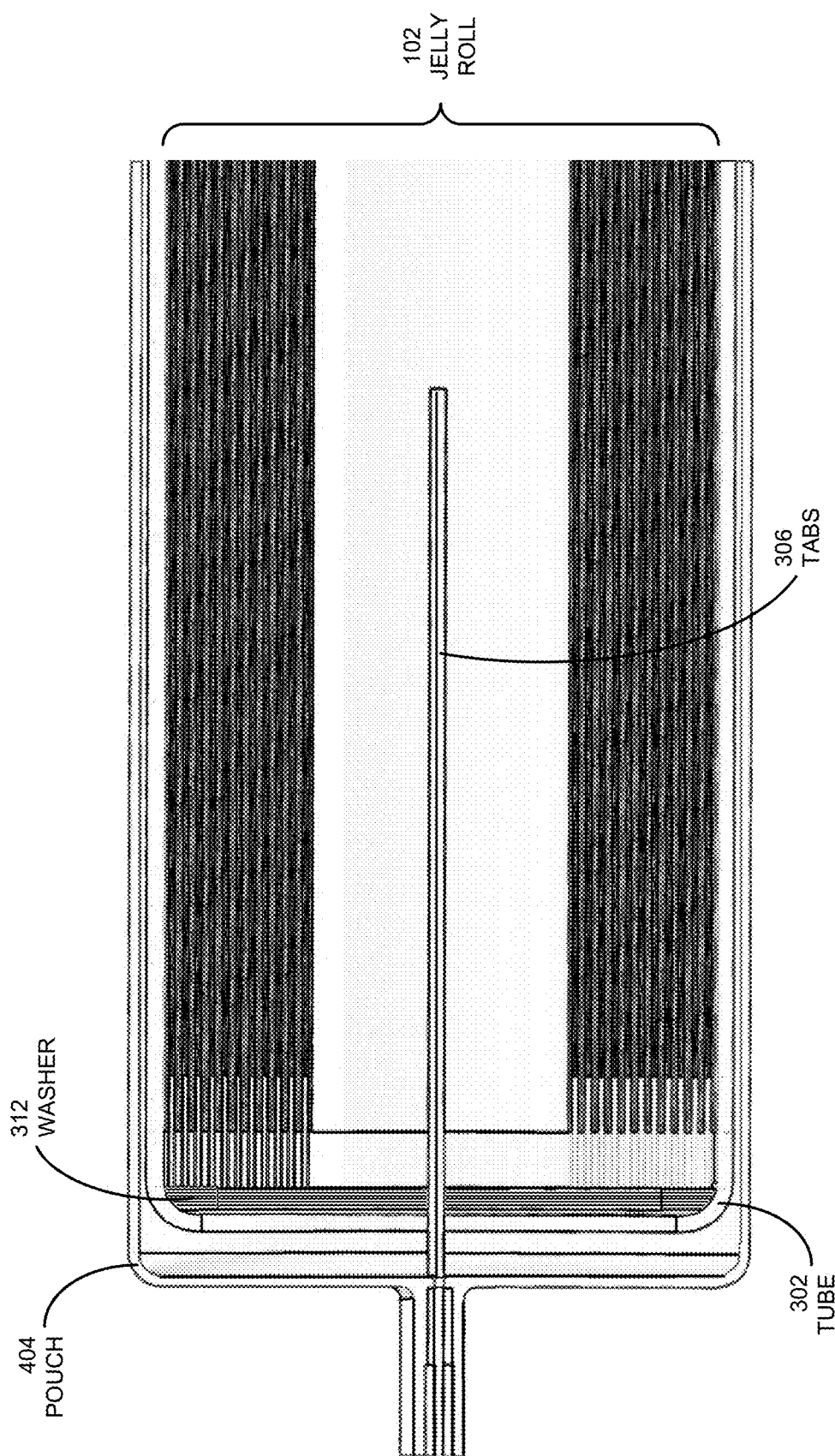
FIG. 3B shows a cross-sectional view of a battery cell in accordance with the disclosed embodiments.

Alternatively, as shown in FIG. 3B, a washer 312 made of plastic and/or another soft, insulating material may be disposed between the end of jelly roll 102 and the edge of tube 302 adjacent to the end of jelly roll 102. In addition, the edge of tube 302 may be curved inward to laterally constrain jelly roll 102 inside pouch 404. For example, the edge of tube 302 may initially be flared outward to facilitate insertion of jelly roll 102 in tube 302. After jelly roll 102 is inserted in tube 302, washer 312 may be placed in tube 302 next to jelly roll 102, and the flared edge of tube 302 may be bent inward to laterally constrain washer 312 and jelly roll 102.

Washer 312 may thus protect the end of jelly roll 102 from damage by the curved edge of tube 302. Another washer (not shown) may be placed between the other end of jelly roll 102 and the other edge of tube 302 to prevent damage to both ends of jelly roll 102 by tube 302.

Figure 4:
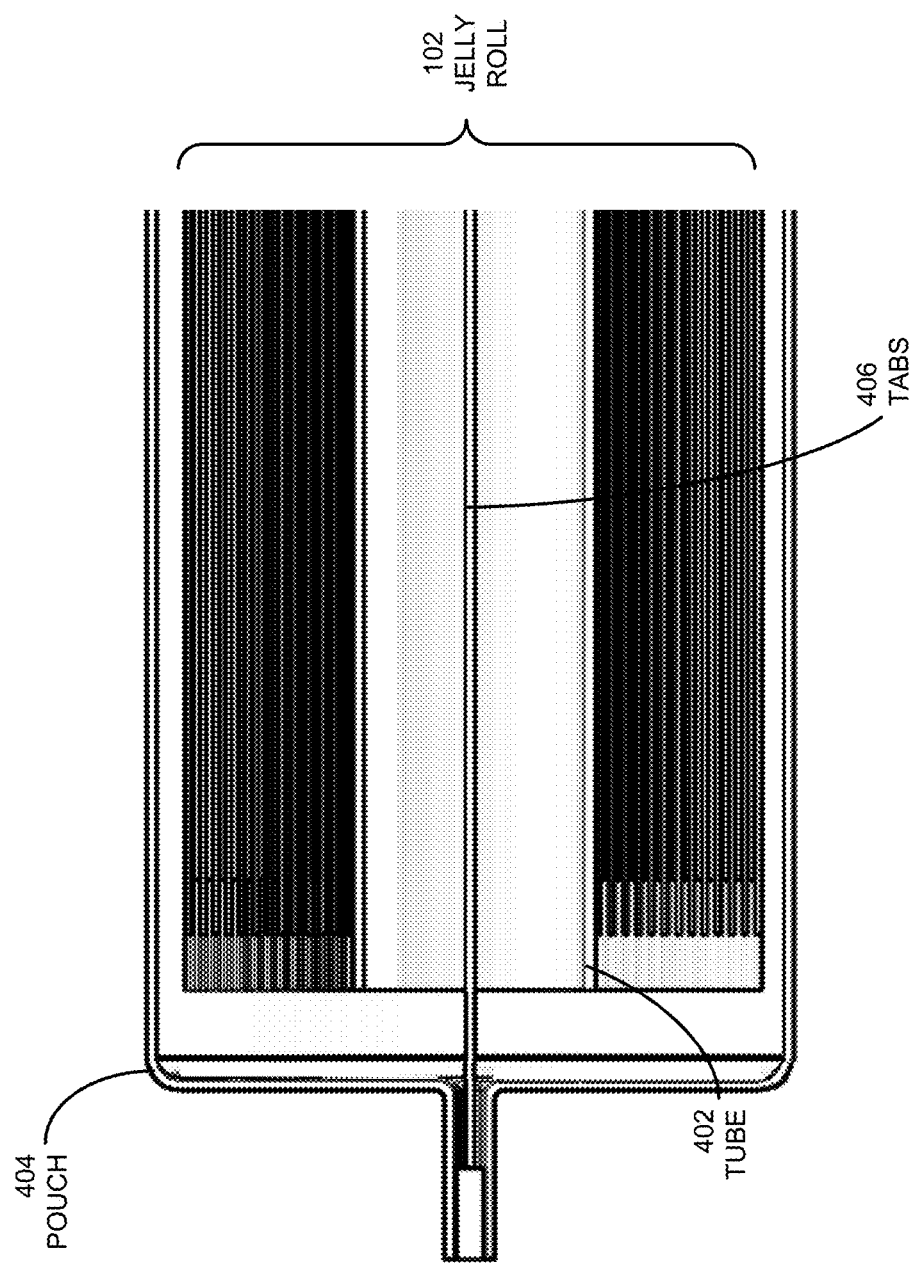
FIG. 4 shows a cross-sectional view of a battery cell in accordance with the disclosed embodiments.

As shown in FIG. 4, the mechanical structure may be a tube 402 that is disposed within the interior perimeter of jelly roll 102 instead of around the exterior perimeter of jelly roll. For example, tube 402 may be a mandrel around which the cathode, anode and separator layers of the battery cell are wound to create jelly roll 102.

Figure 2:
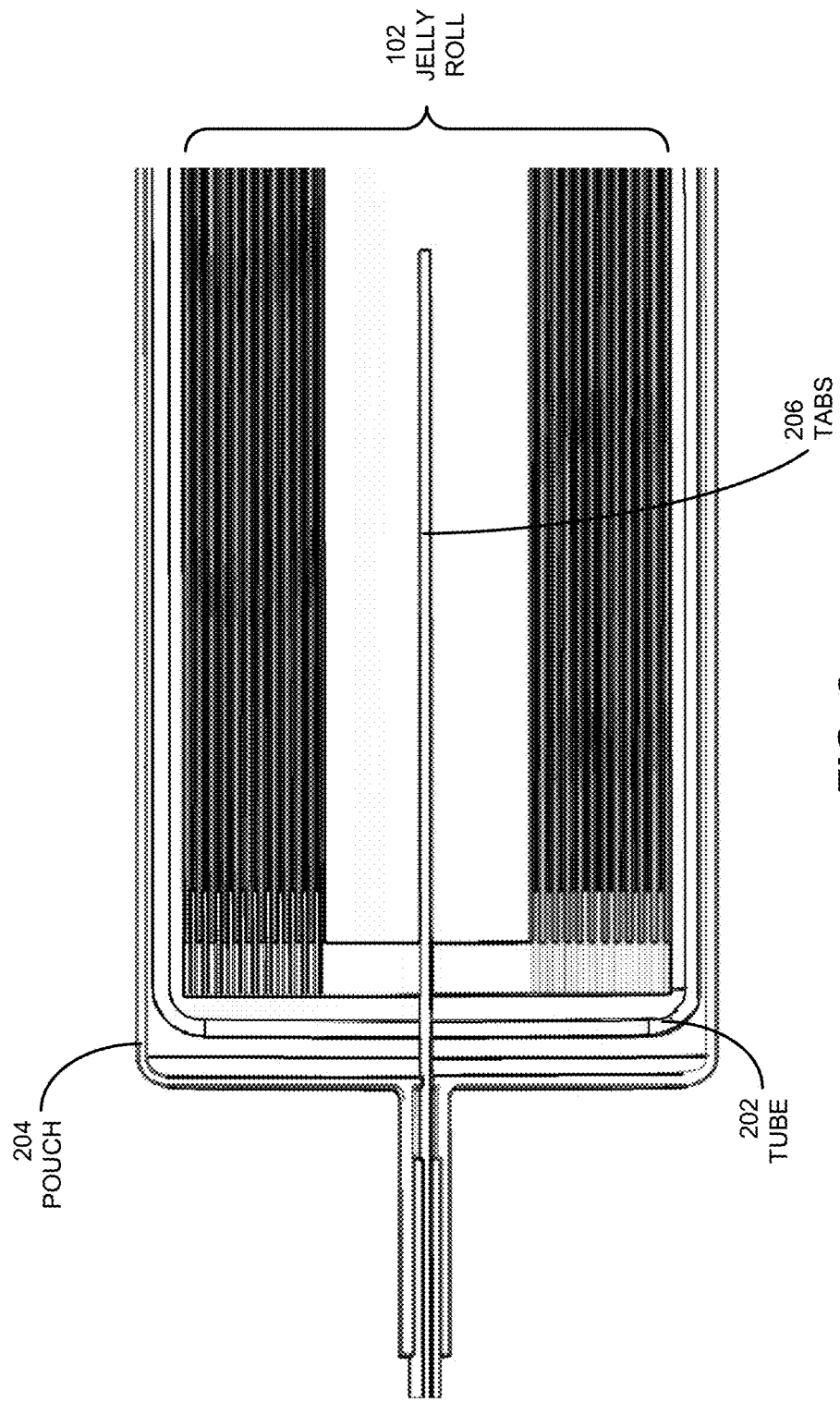
FIG. 2 shows a cross-sectional view of a battery cell in accordance with the disclosed embodiments.

As with the battery cells of FIGS. 2 and 3A-3B, jelly roll 102 and tube 402 may be sealed in a flexible pouch 404, and conductive tabs 406 may be coupled to the cathode and anode of jelly roll 102 and extended through seals in pouch 404 to provide terminals for the battery cell. Tube 402 may thus provide a mechanical structure that maintains the structural integrity of jelly roll 102. For example, tube 402 may be a metal, plastic, ceramic, and/or perforated tube that prevents jelly roll 102 from swelling beyond the space inside tube 402 by structurally reinforcing jelly roll 102 from the inside.

Figure 5A:
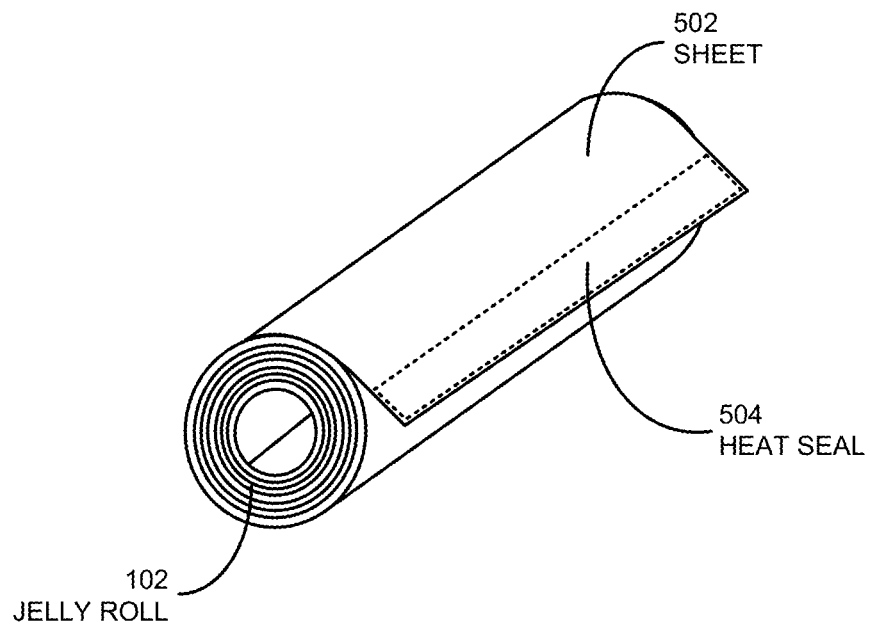
FIG. 5A shows a mechanical structure for maintaining the structural integrity of a jelly roll in accordance with the disclosed embodiments.

The mechanical structure may also be formed from non-tubular components. As shown in FIG. 5A, the perimeter of jelly roll 102 may be enclosed by a mechanical structure formed by wrapping a sheet 502 around jelly roll 102. A heat seal 504 may be created in sheet 502 to enclose the perimeter of jelly roll 102 in sheet 502 and prevent jelly roll 102 from swelling beyond a pre-specified diameter (e.g., the inner diameter of the cylinder formed by sheet 502).

Figure 5B:
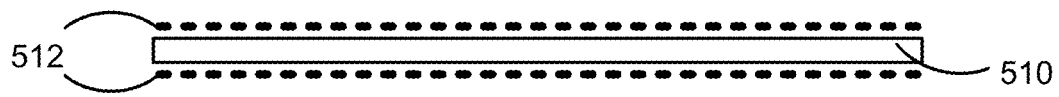
FIG. 5B shows a cross-sectional view of a sheet for forming a mechanical structure enclosing a perimeter of a jelly roll in accordance with the disclosed embodiments.

As shown in FIG. 5B, sheet 502 may include an inner layer 510 and an outer coating 512 that enables the formation of heat seal 504. For example, a stainless steel layer 510 that is about 75 microns thick may be coated on one or both sides with 10-15 microns of polypropylene, polyethylene, and/or another thermoplastic coating 512 to form sheet 502. After sheet 502 is wrapped around jelly roll 102, heat may be applied to overlapping portions of sheet 502 to melt the thermoplastic and form heat seal 504. Those skilled in the art will appreciate that other types of seals may be used to enclose jelly roll 102 in sheet 502. Such seals may be applied using techniques such as welding, adhesive, and/or mechanical clips.

Figure 6:
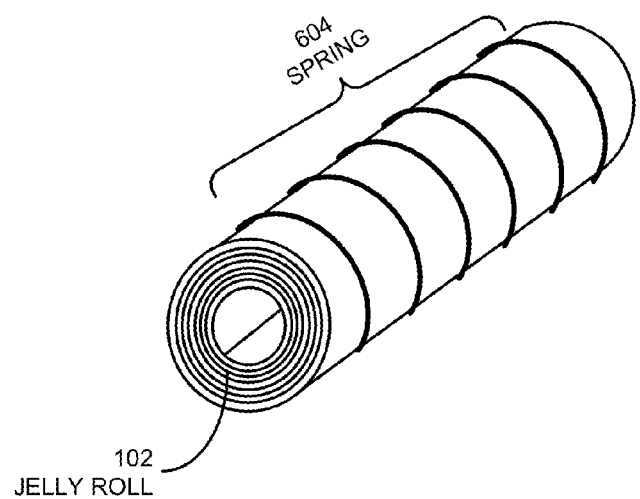
FIG. 6 shows a mechanical structure for maintaining the structural integrity of a jelly roll in accordance with the disclosed embodiments.

Similarly, as shown in FIG. 6, a mechanical structure for constraining swelling in jelly roll 102 may be provided by a spring 604 wrapped around the perimeter of jelly roll 102. Spring 604 may allow for easier assembly of the battery cell and promote electrolyte flow within the battery cell.

Those skilled in the art will appreciate that other types of mechanical structures may be used to maintain the structural integrity of jelly roll 102. For example, swelling in jelly roll 102 may be constrained using a wire mesh, a stent, and/or a high-tensile-strength thread (e.g., metal, Kevlar, etc.) wrapped around jelly roll 102.

Figure 7:
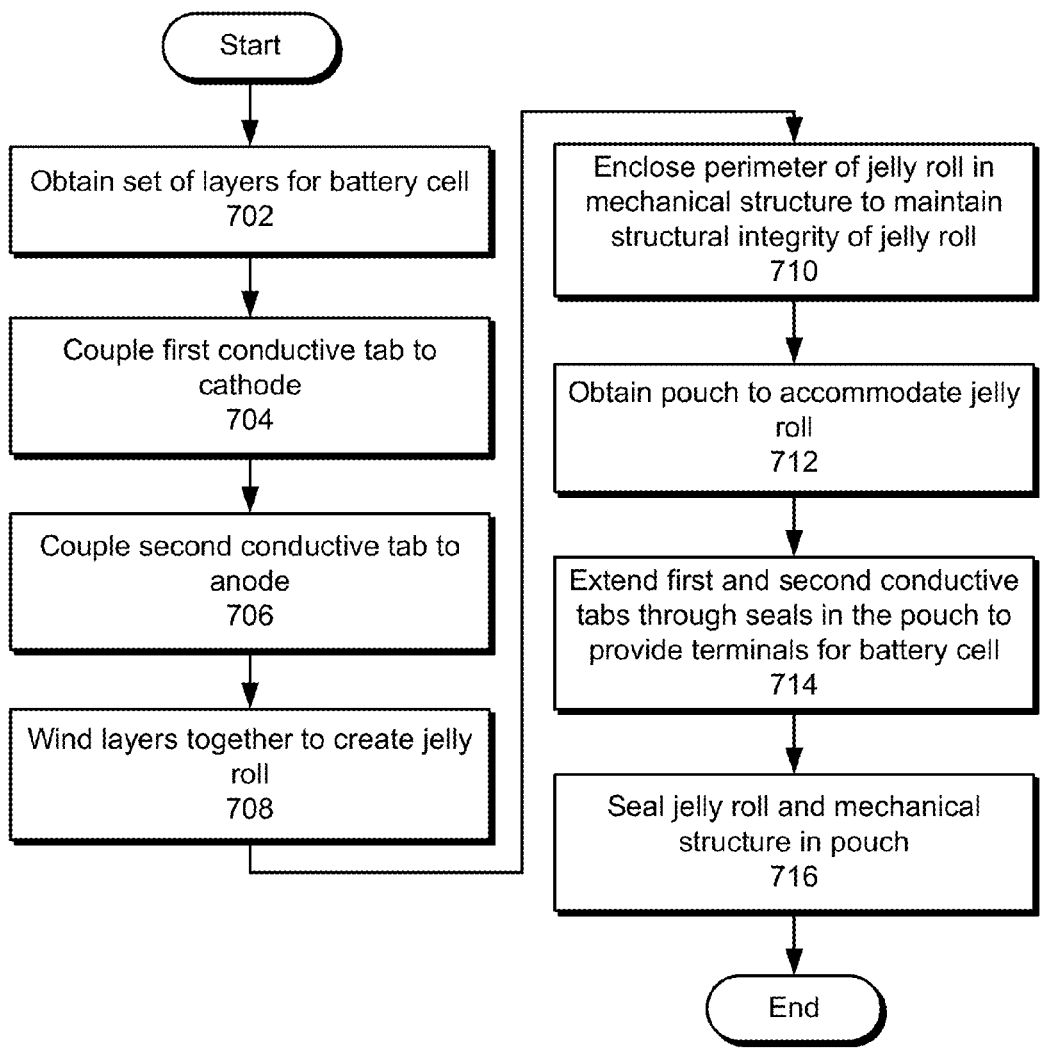
FIG. 7 shows a flowchart illustrating the process of manufacturing a battery cell in accordance with the disclosed embodiments.

FIG. 7 shows a flowchart illustrating the process of manufacturing a battery cell in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, a set of layers for a jelly roll is obtained (operation 702). The layers may include a cathode with an active coating, a separator, and an anode with an active coating. Next, a first conductive tab is coupled to the cathode of the jelly roll (operation 704), and a second conductive tab is coupled to the anode of the jelly roll (operation 706). The layers are then wound together to create a jelly roll (operation 708). For example, the layers may be wound onto a cylindrical mandrel to create a cylindrical jelly roll.

The perimeter of the jelly roll is then enclosed in a mechanical structure to maintain the structural integrity of the jelly roll (operation 710). For example, the jelly roll may be enclosed and/or placed in a tube made of metal, ceramic, and/or plastic. The tube may include one or more perforations to facilitate electrolyte flow in the battery cell. The mechanical structure may additionally include an end cap disposed around an edge of the tube and/or a washer disposed between the edge of the tube and the end of the jelly roll adjacent to the edge to prevent the edge from damaging the jelly roll and/or the battery cell. If a tube is not used to enclose the jelly roll, structural reinforcement of the jelly roll may be provided by a spring, a wire mesh, a thread wrapped around the jelly roll, and/or a sheet wrapped around the jelly roll with a seal (e.g., heat seal, welded seal, adhesive seal, mechanical clip, etc.) to enclose the perimeter of the jelly roll in the sheet.

To assemble the battery cell, a pouch to accommodate the jelly roll is obtained (operation 712), and the first and second conductive tabs are extended through seals in the pouch to provide terminals for the battery cell (operation 714). Finally, the jelly roll and mechanical structure are sealed in the pouch (operation 716). For example, the jelly roll and mechanical structure may be sealed within the pouch by spot welding and/or applying heat to the seals. The mechanical structure may thus provide structural containment of the jelly roll, while the pouch may provide hermetic containment of the battery cell.

Figure 8:
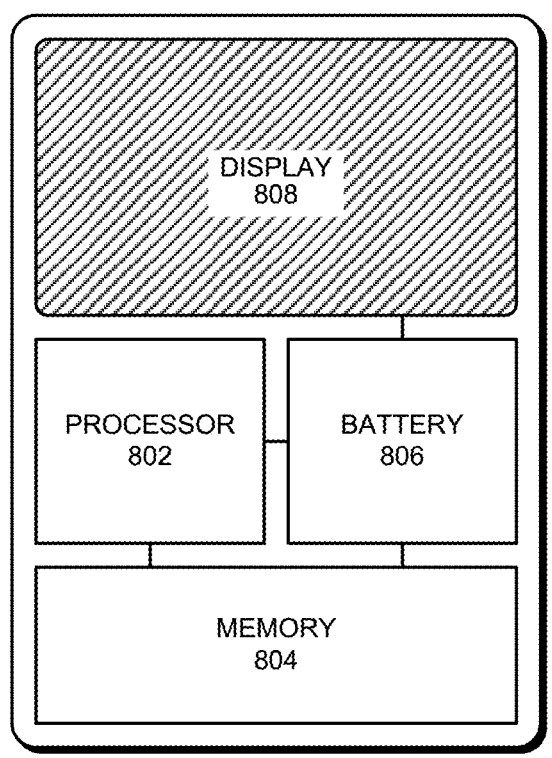
FIG. 8 shows a portable electronic device in accordance with the disclosed embodiments.

The above-described rechargeable battery cell can generally be used in any type of electronic device. For example, FIG. 8 illustrates a portable electronic device 800, which includes a processor 802, a memory 804 and a display 808, which are all powered by a battery 806. Portable electronic device 800 may correspond to a laptop computer, mobile phone, PDA, tablet computer, portable media player, digital camera, remote control, game controller, flashlight, peripheral device, and/or other type of battery-powered electronic device. Battery 806 may correspond to a battery pack that includes one or more battery cells. Each battery cell may include a set of layers, which are wound together to form a jelly roll, including a cathode with an active coating, a separator, and/or an anode with an active coating.

The battery cell may also include a mechanical structure enclosing the perimeter of the jelly roll to maintain the structural integrity of the jelly roll. For example, the mechanical structure may include a tube, an end cap, and/or a plastic washer; a spring; a wire mesh; a thread wrapped around the jelly roll; and/or a sheet wrapped around the jelly roll with a seal to enclose the perimeter of the jelly roll in the sheet. The mechanical structure and jelly roll may be enclosed in a flexible pouch. In addition, a first conductive tab may be coupled to the cathode, a second conductive tab may be coupled to the anode, and both conductive tabs may extend through seals in the pouch to provide terminals for the battery cell.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
   a jelly roll comprising layers which are wound together, including a cathode with an active coating, a separator, and an anode with an active coating;
   a mechanical structure comprising a single body disposed at least one revolution around a perimeter of the jelly roll and extending past at least one end of the jelly roll, wherein the mechanical structure maintains a structural integrity of the jelly roll; and
   a pouch enclosing the mechanical structure and the jelly roll, wherein the pouch is flexible.

2. The battery cell of claim 1, further comprising:
   a first conductive tab coupled to the cathode; and
   a second conductive tab coupled to the anode,
   wherein the first and second conductive tabs extend through seals in the pouch to provide terminals for the battery cell.

3. The battery cell of claim 1, wherein the mechanical structure comprises a tube.

4. The battery cell of claim 3, wherein the mechanical structure further comprises at least one of:
   an end cap disposed around an edge of the tube to prevent damage to the pouch by the tube; and
   a plastic washer disposed between an end of the jelly roll and an edge of the tube adjacent to the end of the jelly roll.

5. The battery cell of claim 3, wherein the tube comprises at least one of metal, plastic, ceramic, and a perforation.

6. The battery cell of claim 1, wherein the jelly roll is cylindrical.

7. A method for manufacturing a battery cell, comprising:
   obtaining a set of layers for the battery cell, wherein the set of layers comprises a cathode with an active coating, a separator, and an anode with an active coating;
   winding the layers to create a jelly roll;
   enclosing a perimeter of the jelly roll in a mechanical structure to maintain a structural integrity of the jelly roll, the mechanical structure comprising a single body disposed at least one revolution around the perimeter and extending past at least one end of the jelly roll; and
   sealing the jelly roll and the mechanical structure in a pouch, wherein the pouch is flexible.

8. The method of claim 7, further comprising:
   coupling a first conductive tab to the cathode;
   coupling a second conductive tab to the anode; and
   extending the first and second conductive tabs through seals in the pouch to provide terminals for the battery cell.

9. The method of claim 7, wherein the mechanical structure comprises a tube.

10. The method of claim 9, wherein the mechanical structure further comprises at least one of:
    an end cap disposed around an edge of the tube to prevent damage to the pouch by the tube; and
    a plastic washer disposed between an end of the jelly roll and an edge of the tube adjacent to the end of the jelly roll.

11. The method of claim 9, wherein the tube comprises at least one of metal, plastic, ceramic, and a perforation.

12. A portable electronic device, comprising:
    a set of components powered by a battery pack; and
    the battery pack, comprising:
       a battery cell, comprising:
          a jelly roll comprising layers which are wound together, including a cathode with an active coating, a separator, and an anode with an active coating;
          a mechanical structure comprising a single body disposed at least one revolution around a perimeter of the jelly roll and extending past at least one end of the jelly roll, wherein the mechanical structure maintains a structural integrity of the jelly roll; and
          a pouch enclosing the mechanical structure and the jelly roll, wherein the pouch is flexible.

13. The portable electronic device of claim 12, wherein the mechanical structure comprises a tube.

14. The portable electronic device of claim 13, wherein the mechanical structure further comprises at least one of:
    an end cap disposed around an edge of the tube to prevent damage to the pouch by the tube; and
    a plastic washer disposed between an end of the jelly roll and an edge of the tube adjacent to the end of the jelly roll.

15. The portable electronic device of claim 13, wherein the tube comprises at least one of metal, plastic, ceramic, and a perforation.

16. The battery cell of claim 1, wherein the perimeter is an outer perimeter.

17. The method of claim 7, wherein the perimeter is an outer perimeter.

18. The portable electronic device of claim 12, wherein the perimeter is an outer perimeter.

* * * * *